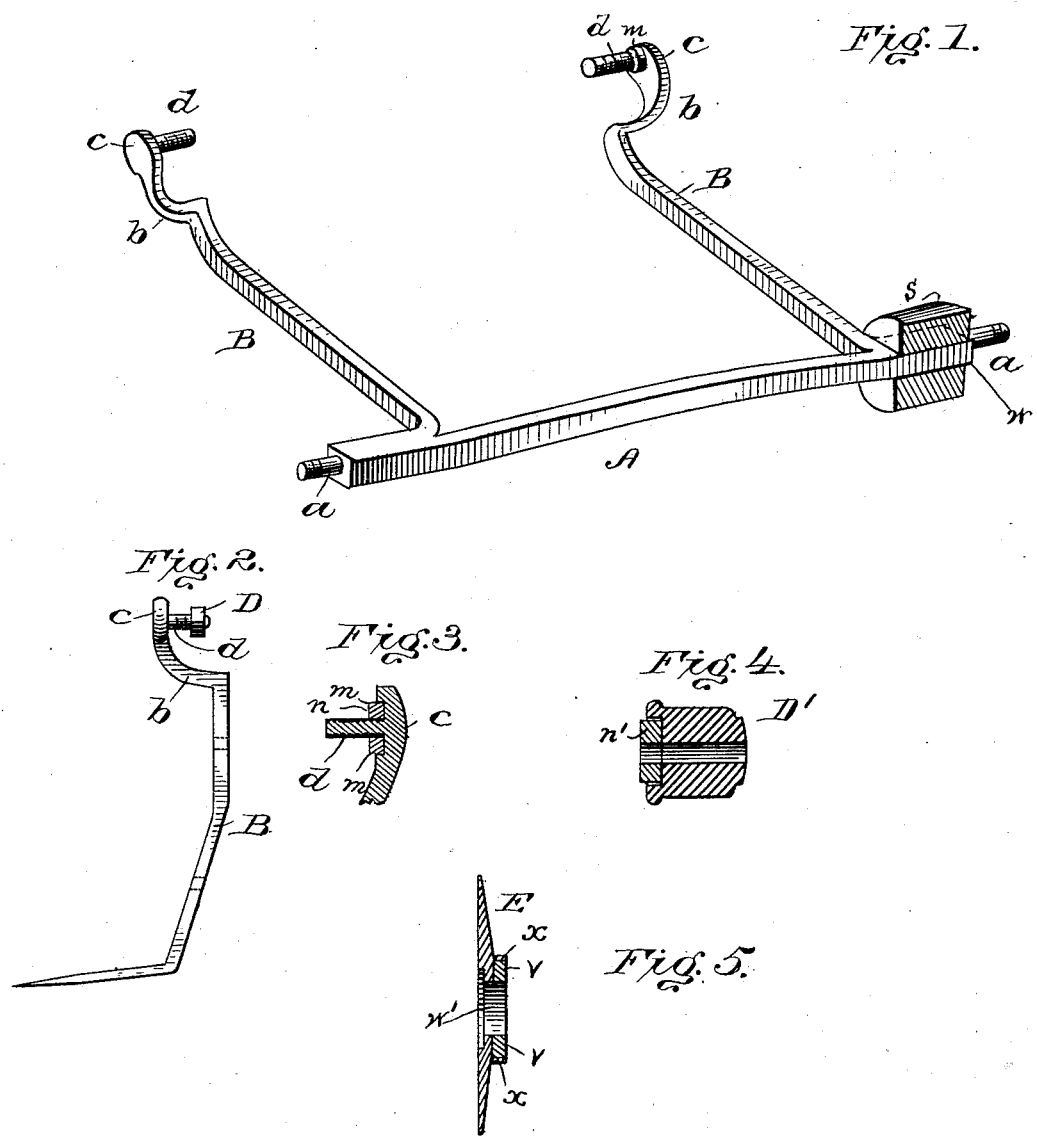

UNITED STATES PATENT OFFICE.

PHIL. WHITE, OF ROME, NEW YORK.

SHIFTING-RAIL FOR VEHICLES.

SPECIFICATION forming part of Letters Patent No. 362,132, dated May 3, 1887.

Application filed September 30, 1886. Serial No. 214,958. (No model.)

*To all whom it may concern:*

Be it known that I, PHIL. WHITE, a citizen of the United States, residing at Rome, in the county of Oneida and State of New York, have invented certain new and useful Improvements in Shifting-Rails for Vehicles; and I do hereby declare the following to be a full, clear, and exact description of the invention, such as will enable others skilled in the art to which it appertains to make and use the same.

My invention relates to improvements in shifting-rails for vehicles and their connections, and the same will be fully explained in the following specification, reference being had to the accompanying drawings, in which—

Figure 1 is a perspective view of my shifting-rail. Fig. 2 is a side view of my improved front prop adapted to a stationary-top vehicle. Fig. 3 is a sectional view of the head and bow pivot of the front prop. Fig. 4 is a vertical section of a prop-nut, and Fig. 5 is a vertical section of a prop-washer.

In the shifting-rails in use and as patented, so far as I am aware, the front props support the top bows on outwardly-turned bow-pivots, and the latter, provided with washers and nuts, hold the bows in place. When these nuts work loose, the bows rattle on the pivots, the latter are rapidly worn by the friction, and the screw-thread on the pivot is so damaged that it becomes necessary to put on an entirely new front prop. Should the pivot-nut come off, as often happens, the weight and shape of the top presses the bows outward, causes them to slip off the pivot, and the top falls down.

In my improved shifting-rail there can be no rattling, and should the pivot-nut come off the very pressure which serves to throw off the top in the present rails will keep the top on.

In Fig. 1 of the drawings, A represents the back prop of a shifting-rail, to which is attached, by welding or otherwise, the front props, B. The shoulders *b* of the front props turn outwardly and are curved slightly in an upward direction, the pivots *d* turn inwardly from the heads *c* at or near right angles with the shank *a*, and the end of the pivot is within the line formed by the shank. A portion of the pivots *d* is threaded for the reception of the nut D. The inner side of the head *c* is reamed out around the pivot for the reception of a washer, *n*, which is surrounded by the flange *m*, as shown in Fig. 3. The nut D' is also reamed out, as shown in Fig. 4, for the reception of a washer, *n'*. The latter, extending beyond the rim or flange of the nut, bears against the bows and prevents rattling at that point. It is common to provide a washer for the bow-pivot; but it has been found that in tightening the nut the washer is frequently cut, and when so cut it falls off.

In my improvement one washer is partly embedded in the nut on the outside of the bow and another washer is partly embedded in the pivot-head *c* on the opposite side of the bow. Neither washer can be cut on a line with its circumference, and if by pressure it should be cut diametrically the surrounding flange or rim will hold it in place and at the same time, the washers extending beyond their surrounding flanges, prevent all rattling.

The prop shown in Fig. 2 is identical with that embodied in Fig. 1, except that its shank is bent to conform to the side or seat of the vehicle to which it is attached, instead of being united with the back prop. This form of prop is intended to support the front bows or standards of vehicles having stationary tops.

The back prop, A, I provide with a washer, E, made of brass, hard rubber, or any suitable material, circular in form and constructed with a rim or flange on its face or outside surface, corresponding in size with the rim or flange on the prop-nut, and having its back or inside surface recessed about two-thirds the thickness of the washer. This recessed portion *w'* will be square in shape, in order to fit on the square portion *w* of the back prop, and thus bring the rubber guard *s*, Fig. 1, snugly against the washer and prevent all rattling at this point. The rim *x* on the washer surrounds a secondary washer, *v*, of rubber or leather, which is cut with a hole in its center to correspond with the hole in the washer E. This secondary washer extends beyond the rim *x*, so as to abut against the back bows. It will be seen that this manner of securing washers may be applied to any of the parts of a buggy where it is desired to secure an anti-rattling surface; but my special object is to apply it to the shifting-rail and props and their connections. By placing the pivot-nut on the front prop inside the bows I make a much neater-looking job than when the nuts are on the outside, as is necessary in the present form of shifting-rail. It will also be seen that by the upward curving of the front prop I throw the weight or thrust of the top nearer the center of the prop, and consequently secure a stronger rail.

Having thus described my invention, what I desire to claim as new is—

1. A shifting-rail for vehicles, consisting of a back prop and side props having inwardly-turned bow-pivots, as set forth.

2. A front prop or support for vehicle-top bows, consisting of a shank, an outwardly-turned shoulder, a head reamed on its inner side for the reception of a washer, and an inwardly-turned bow-pivot, substantially as described.

3. In a vehicle-top, the combination of its supports having their bearing portions reamed for the reception of washers with nuts having their inner sides reamed for the reception of corresponding washers, substantially as and for the purposes set forth.

4. The combination, in a shifting-rail, of the back prop, A, provided with a washer, E, the front props, B, having inwardly-turned bow-pivots, and reamed heads $c$, and the pivot-nuts D, as and for the purposes described.

In testimony whereof I affix my signature in presence of two witnesses.

PHIL. WHITE.

Witnesses:
FRANK CHELLIS,
WM. KNOX.